(12) United States Patent
Yamazaki et al.

(10) Patent No.: US 8,818,183 B2
(45) Date of Patent: Aug. 26, 2014

(54) FOCUS DETECTION APPARATUS AND METHOD FOR CONTROLLING THE SAME

(71) Applicant: Canon Kabushiki Kaisha, Tokyo (JP)

(72) Inventors: Tatsuhiko Yamazaki, Zama (JP); Hidetoshi Hayashi, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 13/754,053

(22) Filed: Jan. 30, 2013

(65) Prior Publication Data

US 2013/0202281 A1  Aug. 8, 2013

(30) Foreign Application Priority Data

Feb. 2, 2012  (JP) ................................. 2012-021339

(51) Int. Cl.
  *G03B 13/18*  (2006.01)
  *H04N 5/353*  (2011.01)

(52) U.S. Cl.
  USPC ............................................ 396/96; 348/297

(58) Field of Classification Search
  USPC ............................................ 396/96; 348/297
  See application file for complete search history.

(56) References Cited

U.S. PATENT DOCUMENTS

| 6,308,014 B1 * | 10/2001 | Nonaka et al. ................ 396/106 |
| 6,470,148 B2 * | 10/2002 | Ide et al. .......................... 396/80 |
| 7,102,675 B1 * | 9/2006 | Tokunaga ....................... 348/297 |
| 2013/0063632 A1 | 3/2013 | Yamamoto et al. |

FOREIGN PATENT DOCUMENTS

JP  11-205694 A  7/1999

* cited by examiner

*Primary Examiner* — Clayton E LaBalle
*Assistant Examiner* — Leon W Rhodes, Jr.
(74) *Attorney, Agent, or Firm* — Fitzpatrick, Cella, Harper & Scinto

(57) ABSTRACT

A focus detection apparatus that performs a first determination for determining whether a signal level indicating an amount of the electric charges accumulated in the photoelectric conversion element has reached a lower threshold, and a second determination for determining whether the signal level has reached a higher second. During a time period from when it is determined that the signal level has reached the lower threshold to when it is determined that the signal level has reached the higher threshold, the second determination is performed at a shorter time interval if an elapsed time from when the accumulation of the electric charges is started to when it is determined that the signal level has reached the first threshold is shorter than a reference time, and at a longer time interval if the elapsed time is longer than the reference time.

6 Claims, 9 Drawing Sheets

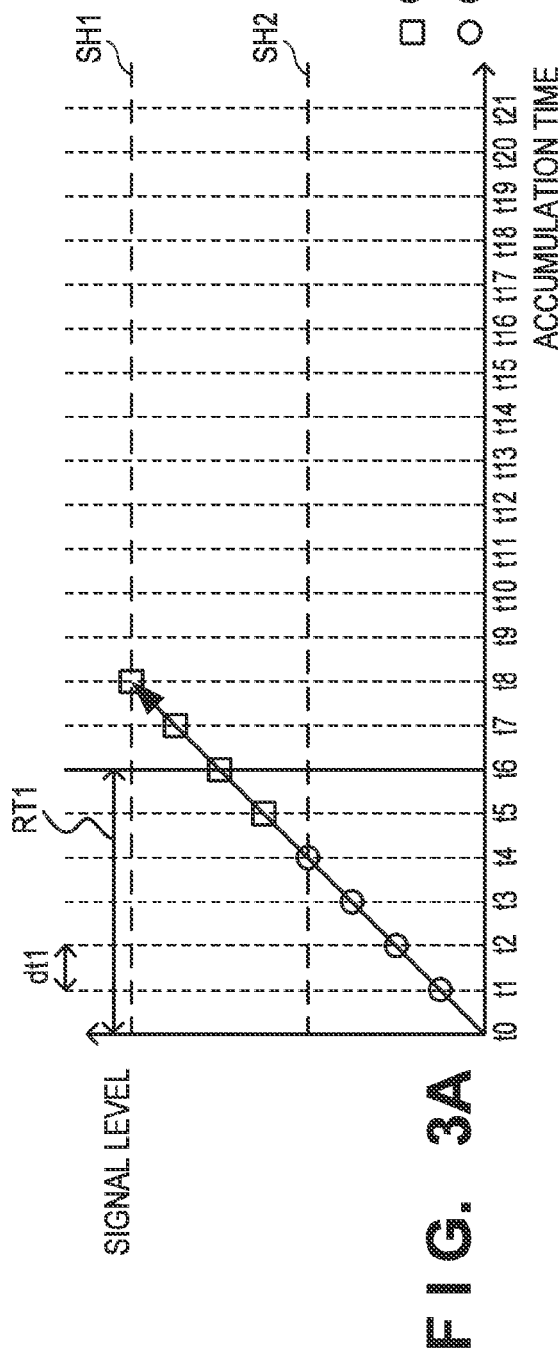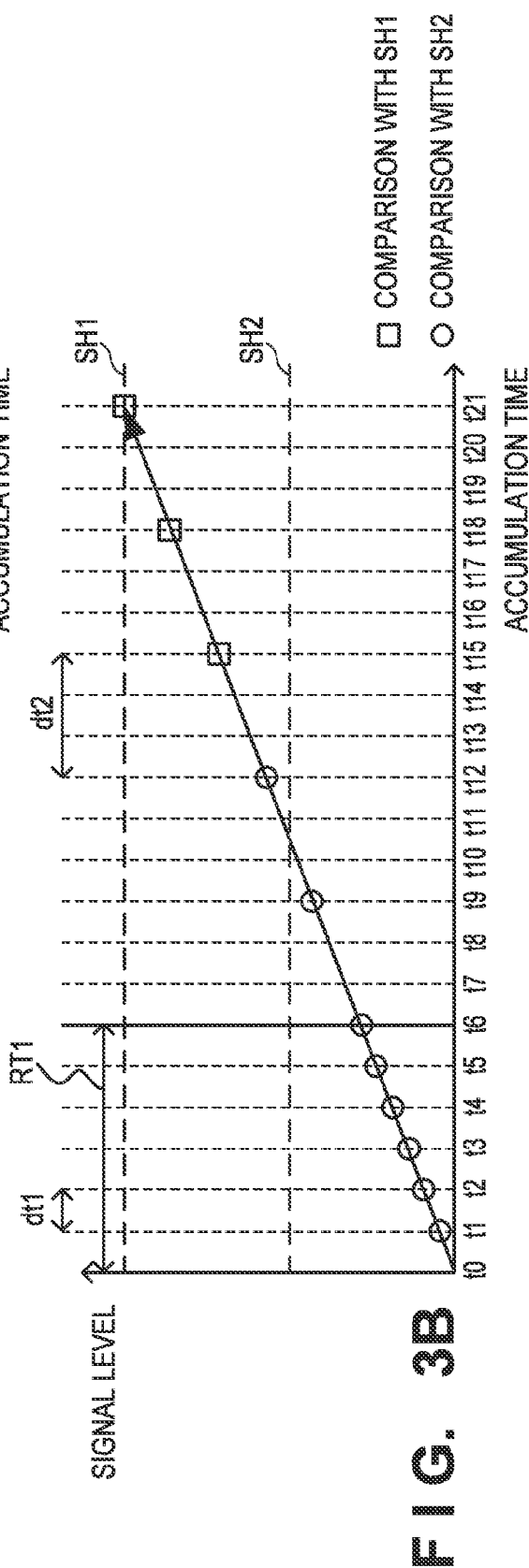

FOCUS DETECTION APPARATUS AND METHOD FOR CONTROLLING THE SAME

BACKGROUND OF THE INVENTION

1. Field of the Invention

The present invention relates to a focus detection apparatus and a method for controlling the same.

2. Description of the Related Art

With a focus detection apparatus, an electric charge accumulation state is monitored in order to appropriately control an amount of electric charges accumulated in a photoelectric conversion element in a sensor. Japanese Patent Laid-Open No. 11-205694 proposes technology in which in order to reduce power consumption of a focus detection apparatus, a time interval for monitoring the electric charge accumulation state of the sensor is lengthened after a predetermined time has elapsed from when accumulation of electric charges is started. This prevents the signal from the photoelectric conversion element from becoming saturated in the case where an object has high luminance, and reduces power consumption by lengthening the time interval for monitoring in the case where the object has low luminance.

SUMMARY OF THE INVENTION

With Japanese Patent Laid-Open No. 11-205694, the reduction in power consumption is not sufficient, since the accumulation state is monitored for a short time interval until a predetermined time has elapsed even in the case where the object has low luminance. In view of this, an aspect of the present invention provides technology for reducing the power consumption of a focus detection apparatus.

A first aspect provides a focus detection apparatus comprising: a control unit configured to cause a photoelectric conversion element in a sensor to accumulate an electric charge; a timer unit configured to measure a time elapsed from when accumulation of the electric charges is started; a measurement unit configured to measure a signal level indicating an amount of the electric charges accumulated in the photoelectric conversion element; a determination unit configured to perform a first determination for determining whether the signal level has reached a first threshold, and to perform a second determination for determining whether the signal level has reached a second threshold that is greater than the first threshold; and a detection unit configured to perform focus detection using a signal obtained from the photoelectric conversion element in the sensor, wherein during a time period from when it is determined that the signal level has reached the first threshold to when it is determined that the signal level has reached the second threshold, the determination unit performs the second determination at a first time interval if an elapsed time from when the accumulation of the electric charges is started to when it is determined that the signal level has reached the first threshold is shorter than a reference time, and performs the second determination at a second time interval that is longer than the first time interval if the elapsed time is longer than the reference time, in a case where it is determined that the signal level has reached the second threshold, the control unit ends the accumulation of the electric charges, and the detection unit performs focus detection using a signal obtained from the sensor after the accumulation of the electric charges has ended.

A second aspect provides a method for controlling a focus detection apparatus that includes a sensor having a photoelectric conversion element that accumulates an electric charge, the method comprising: measuring a signal level indicating an amount of the electric charges accumulated in the photoelectric conversion element; determining whether the signal level has reached a first threshold; determining whether the signal level has reached a second threshold that is greater than the first threshold; ending the accumulation of the electric charges in a case where it is determined that the signal level has reached the second threshold; and performing focus detection using a signal obtained from the sensor after the accumulation of the electric charges has ended, wherein during a time period from when it is determined that the signal level has reached the first threshold to when it is determined that the signal level has reached the second threshold, whether the signal level has reached the first threshold is determined at a first time interval if an elapsed time from when the accumulation of the electric charges is started to when it is determined that the signal level has reached the first threshold is shorter than a reference time, and whether the signal level has reached the second threshold is determined at a second time interval that is longer than the first time interval if the elapsed time is longer than the reference time.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 3A and 3B are diagrams for illustrating an overview of operations of the focus detection apparatus of the first embodiment of the present invention.

DESCRIPTION OF THE EMBODIMENTS

Figure 1:
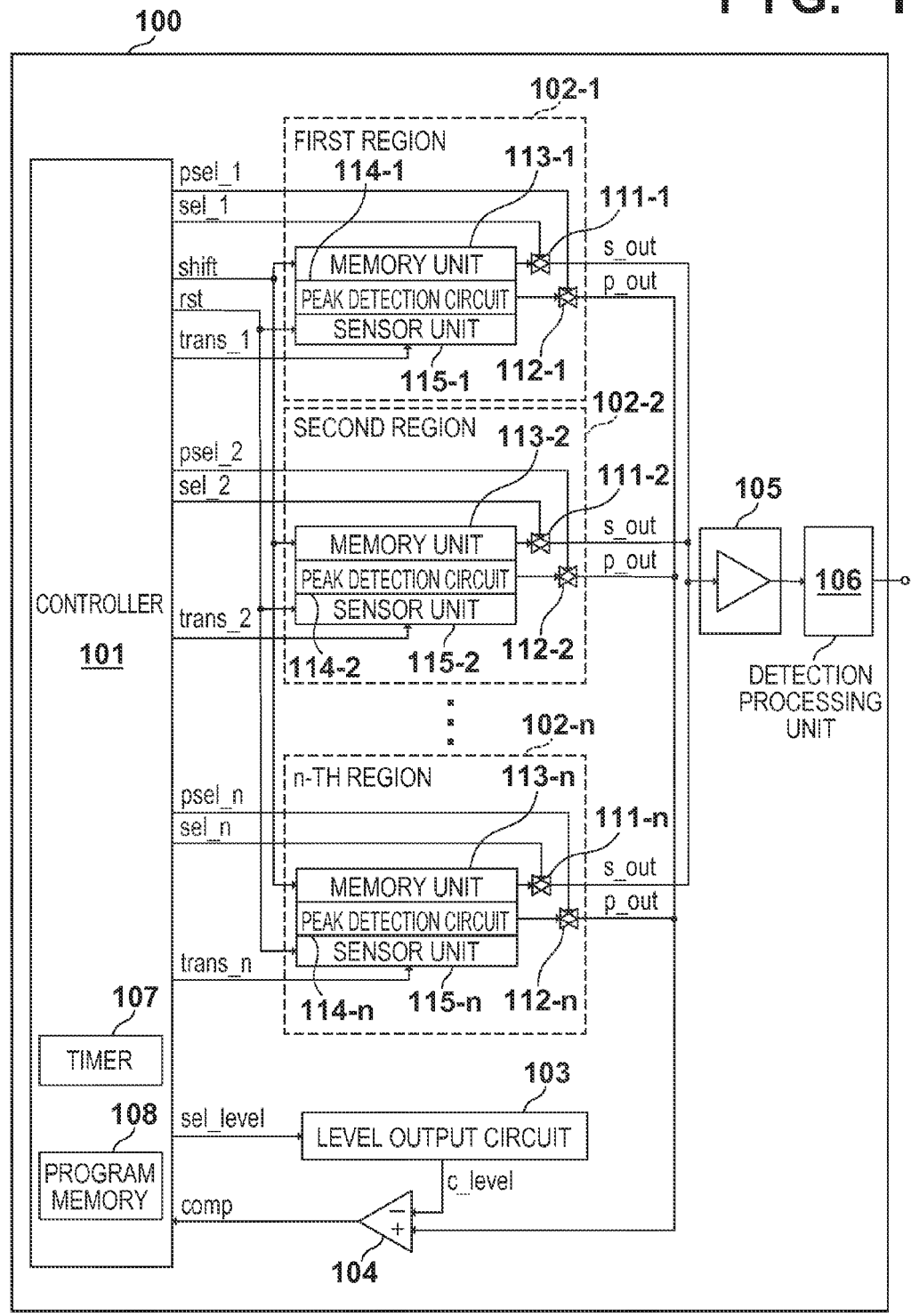
FIG. 1 is a block diagram showing an example of a focus detection apparatus of a first embodiment of the present invention.

Embodiments of the present invention are described below, with reference to the accompanying drawings. The same reference numerals are given to similar elements throughout the various embodiments, and redundant description is omitted. Embodiments described below relate to a focus detection apparatus that is applicable to image sensing apparatuses such as a camera and a video camera.

A focus detection apparatus according to a first embodiment of the present invention will be described using FIGS. 1 to 4. FIG. 1 is a block diagram showing an example of a focus detection apparatus 100 according to the first embodiment. Although the focus detection apparatus 100 in FIG. 1 is capable of detecting focal points in a plurality of regions, the present invention is also applicable to a focus detection apparatus capable of detecting a focal point in one region.

The focus detection apparatus 100 may include a controller 101, a plurality of sensor blocks 102-1 to 102-$n$ (n is an integer that is greater than or equal to 2), a level output circuit 103, a comparator 104, a readout amplifier 105, and a detection unit 106. The plurality of sensor blocks 102-1 to 102-$n$ are arranged in a first region to n-th region which respectively serve as different focus detection points. Focus states in the first region to the n-th region can be respectively detected by these sensor blocks. Since the sensor blocks may have a similar configuration, the configuration and the operation of the sensor block 102-1 are described hereinafter as a representative example.

The controller 101 controls overall operations of the focus detection apparatus 100, and particularly controls the accumulation of electric charges of the sensor blocks 102-1 to 102-$n$. The controller 101 may have a timer 107 for measuring the electric charge accumulation time, and a program memory 108 in which processing programs for performing various controls are stored in advance. The controller 101 controls the focus detection apparatus 100 by reading out and executing the processing programs stored in the program memory 108. Control of the focus detection apparatus 100 by the controller 101 will be described later in detail.

The sensor block 102-1 may include a memory unit 113-1, a peak detection circuit 114-1, a sensor unit 115-1, and a plurality of analog switches 111-1 and 112-1. The sensor unit 115-1 has a pair of sensor arrays, and each of the sensor arrays has a plurality of photoelectric conversion elements that constitute approximately 30 to 80 pixels. One of the pair of the sensor arrays forms a first image, and the other pair forms a second image. A focal point is detected by detecting a phase difference between these two images. The sensor unit 115-1 clears electric charges accumulated in its own photoelectric conversion elements in the case of receiving a reset signal "rst" from the controller 101, and newly starts the accumulation of electric charges immediately thereafter. Also, the sensor unit 115-1 ends the accumulation of electric charges in its own photoelectric conversion elements in the case of receiving a signal "trans_1" from the controller 101, and stores the accumulated electric charges in the memory unit 113-1 as pixel signals.

The peak detection circuit 114-1 measures an amount of the electric charges accumulated in each of the photoelectric conversion elements of the sensor unit 115-1, and outputs to the analog switch 112-1 a signal level "p_out" indicating the maximum value of the amounts of electric charges of the plurality of photoelectric conversion elements in the sensor unit 115-1. When the controller 101 outputs a signal "psel_1", the analog switch 112-1 is switched on. In this case, the signal level "p_out" is supplied to the comparator 104. Power may be supplied to the peak detection circuit 114-1 in synchronization with the signal "psel_1". In other words, in the case where the signal "psel_1" is output from the controller 101, power is supplied to the peak detection circuit 114-1, and the peak detection circuit 114-1 outputs the signal level "p_out" of the sensor unit 115-1. While the signal "psel_1" is being not output from the controller 101, power is not supplied to the peak detection circuit 114-1.

When the controller 101 outputs the signal sel_1, the analog switch 111-1 is switched on. In this state, when the controller 101 outputs a signal "shift", each of the pixel signals stored in the memory unit 113-1 is sequentially output to the readout amplifier 105. The readout amplifier 105 multiplies the pixel signal "s_out" of the memory unit 113-1 by a desired gain and outputs the resultant signal to the detection unit 106.

The detection unit 106 detects focal points at focus detection points by comparing the first image and the second image output from the sensor blocks 102-1 to 102-$n$ after the electric charge accumulation has ended.

The level output circuit 103 outputs to the comparator 104 a level signal "c_level" serving as a threshold to be compared with the signal level "p_out", based on a 1-bit selection signal "sel_level" output from the controller 101. The level output circuit 103 is capable of outputting two level signals "c_level" that are different values. The comparator 104 compares the signal level "p_out" from the peak detection circuit 114-1 with the level signal "c_level" from the level output circuit 103, and determines which value is larger. In the case of determining that the signal level "p_out" is smaller than the level signal "c_level", the comparator 104 outputs "0 (false)" as a signal comp to the controller 101. Also, in the case of determining that the signal level "p_out" is larger than the level signal "c_level", the comparator 104 outputs "1 (true)" as a signal comp to the controller 101.

Figure 2:
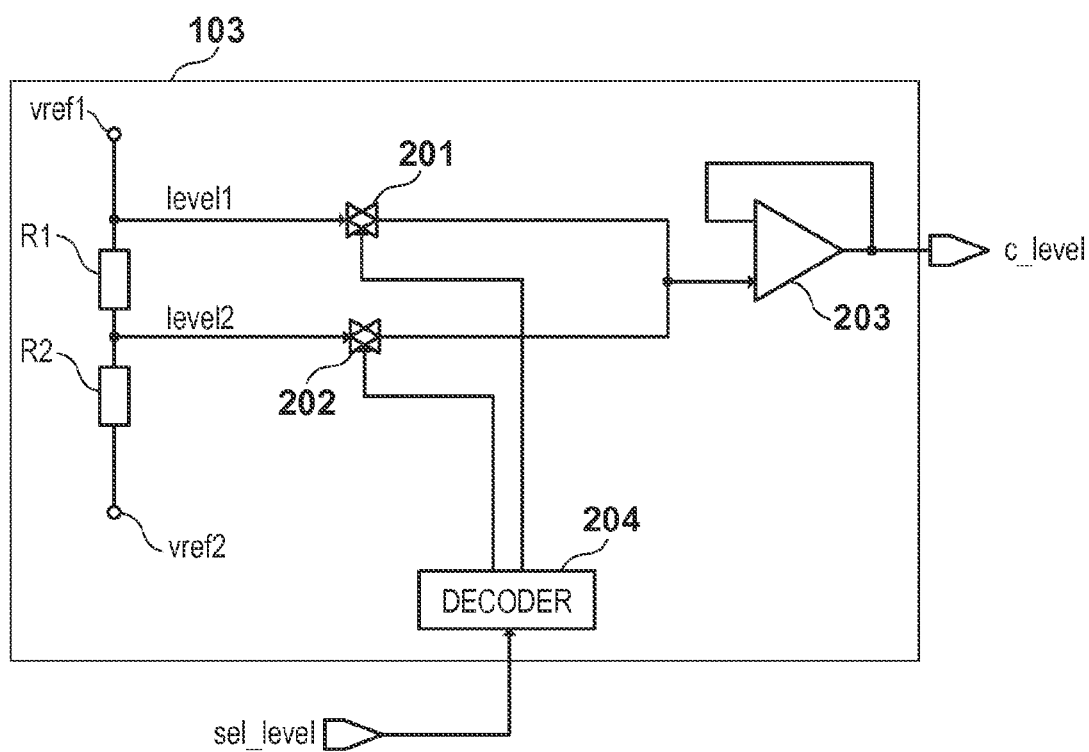
FIG. 2 is a block diagram showing an example of a level output circuit of the first embodiment of the present invention.

FIG. 2 is a block diagram showing an example of the level output circuit 103 of the focus detection apparatus 100 according to the first embodiment. The level output circuit 103 may include two resistors R1 and R2, two analog switches 201 and 202, an amplifier 203, and a decoder 204. The two resistors R1 and R2 are connected in series between two reference voltage sources vref1 and vref2. In this example, it is assumed that an electric potential of the reference voltage source vref1 is higher than that of the reference voltage source vref2. A voltage from the reference voltage source vref1 is input to the analog switch 201 as a voltage level "level1", and a voltage of the node between the resistors R1 and R2 is input to the analog switch 202 as a voltage level "level2". In this example, the voltage level "level1" is a greater value than the voltage level "level2".

The decoder 204 switches on the analog switch 201 and switches off the analog switch 202 if a selection signal "sel_level" that is input is "1". On the other hand, the decoder 204 switches off the analog switch 201 and switches on the analog switch 202 if a selection signal "sel_level" that is input is "0". Thus, one of the voltage level "level1" and the voltage level "level2" is supplied to the amplifier 203 depending on a truth value of the selection signal "sel_level". The amplifier 203 outputs the supplied voltage level as the level signal "c_level".

FIGS. 3A and 3B are diagrams for illustrating an overview of the operations of the focus detection apparatus 100 according to the first embodiment. In graphs of FIGS. 3A and 3B, a horizontal axis indicates the time elapsed from when the accumulation of electric charges in the photoelectric conversion elements in the sensor unit 115-1 is started, i.e. an accumulation time, and the vertical axis indicates a value of the signal level "p_out" output by the peak detection circuit 114-1. A threshold "SH1" (second threshold) is a value of the level signal "c_level" output by the level output circuit 103 in the case where the selection signal "sel_level" is "1". A threshold "SH2" (first threshold) is a value of the level signal "c_level" output by the level output circuit 103 in the case where the selection signal "sel_level" is "0". The value of the threshold "SH2" is smaller than the threshold "SH1". The circles indicate the timing at which the signal level "p_out" is compared with the threshold "SH2", and the squares indicate the timing at which the signal level "p_out" is compared with the threshold "SH1". The graphs of FIGS. 3A and 3B respectively show a change in the signal level "p_out" due to the elapse of the accumulation time. FIG. 3B shows a case where the luminance of the object is lower than that of the object in FIG. 3A, and the signal level increases more gently than in the case of FIG. 3A.

First, the operations of the focus detection apparatus 100 in the case of FIG. 3A are described. At time "t0", the controller 101 outputs a reset signal "rst", and causes the photoelectric conversion elements in the sensor unit 115-1 to start the accumulation of electric charges. After the accumulation of electric charges is started, the controller 101 outputs a signal "psel_1" at a time interval "dt1" (first time interval), and causes the comparator 104 to output the signal level "p_out" from the peak detection circuit 114-1. Then, the controller 101 causes the comparator 104 to determine whether the signal level "p_out" has reached the threshold "SH2" (second determination). In the example of FIG. 3A, it is determined that the signal level "p_out" has reached the threshold "SH2" at time "t4". In this case, the controller 101 switches a target to be compared with the signal level "p_out" in the comparator 104 to the threshold "SH1". Thereafter, at time "t6", a reference time "RT1" elapses from when the accumulation of electric charges is started (time "t0"). The reference time "RT1" may be set in a register (not shown) in the controller 101 in advance (prior to starting accumulation, for example). Since the comparison target is switched to the threshold "SH1" at time "t6" in the example of FIG. 3A, the controller 101 continues to cause the comparator 104 to determine whether the signal level "p_out" has reached the threshold "SH1" at the time interval "dt1" (first determination). In the example of FIG. 3A, it is determined that the signal level "p_out" has reached the threshold "SH1" at time "t8". Thereafter, the controller 101 ends the accumulation of electric charges, and stores the electric charges in the sensor unit 115-1 in the memory unit 113-1 as pixel signals. Then, the detection unit 106 performs focus detection based on these pixel signals.

Next, the operations of the focus detection apparatus 100 in the case of FIG. 3B are described. The controller 101 outputs a reset signal "rst" at time "t0", and causes the photoelectric conversion elements in the sensor unit 115-1 to start the accumulation of electric charges. After the accumulation of electric charges is started, the controller 101 outputs a signal "psel_1" at a time interval "dt1", causes the comparator 104 to output a signal level "p_out" from the peak detection circuit 114-1, and causes the comparator 104 to determine whether the signal level "p_out" has reached the threshold "SH2". Thereafter, at time "t6", a reference time "RT1" elapses from when the accumulation of electric charges is started (time "t0"). Since the comparison target is still the threshold "SH2" at time t6 in the example of FIG. 3B, the controller 101 causes the comparator 104 to determine whether the signal level "p_out" has reached the threshold "SH2" at a time interval "dt2" (second time interval) that is longer than the time interval "dt1". In the example of FIG. 3B, it is determined that the signal level "p_out" has reached the threshold "SH2" at time "t12". In this case, the controller 101 switches the target to be compared with the signal level "p_out" in the comparator 104 to the threshold "SH1". In the example of FIG. 3B, it is determined that the signal level "p_out" has reached the threshold "SH1" at time "t21". Thereafter, the controller 101 ends the accumulation of electric charges, and stores the electric charges in the sensor unit 115-1 in the memory unit 113-1 as pixel signals. Then, the detection unit 106 performs focus detection based on these pixel signals.

In the case where the object has high luminance, as shown in FIG. 3A, since the signal level "p_out" is compared with the threshold "SH1" at the short time interval "dt1" without changing the length thereof in the present embodiment, it is possible to prevent the signal level "p_out" from becoming saturated. Also, in the case where the object has low luminance, as shown in FIG. 3B, since the time interval "dt1" is switched to the longer time interval "dt2" and the signal level "p_out" is compared with the thresholds "SH1" and "SH2" after the reference time "RT1" has elapsed, the number of comparisons by the comparator 104 can be reduced. As a result, power consumption of the focus detection apparatus 100 is reduced. Additionally, in the case where the comparison is not performed, power consumption can be further reduced by turning off the power source of the peak detection circuit 114-1.

Figure 4A:
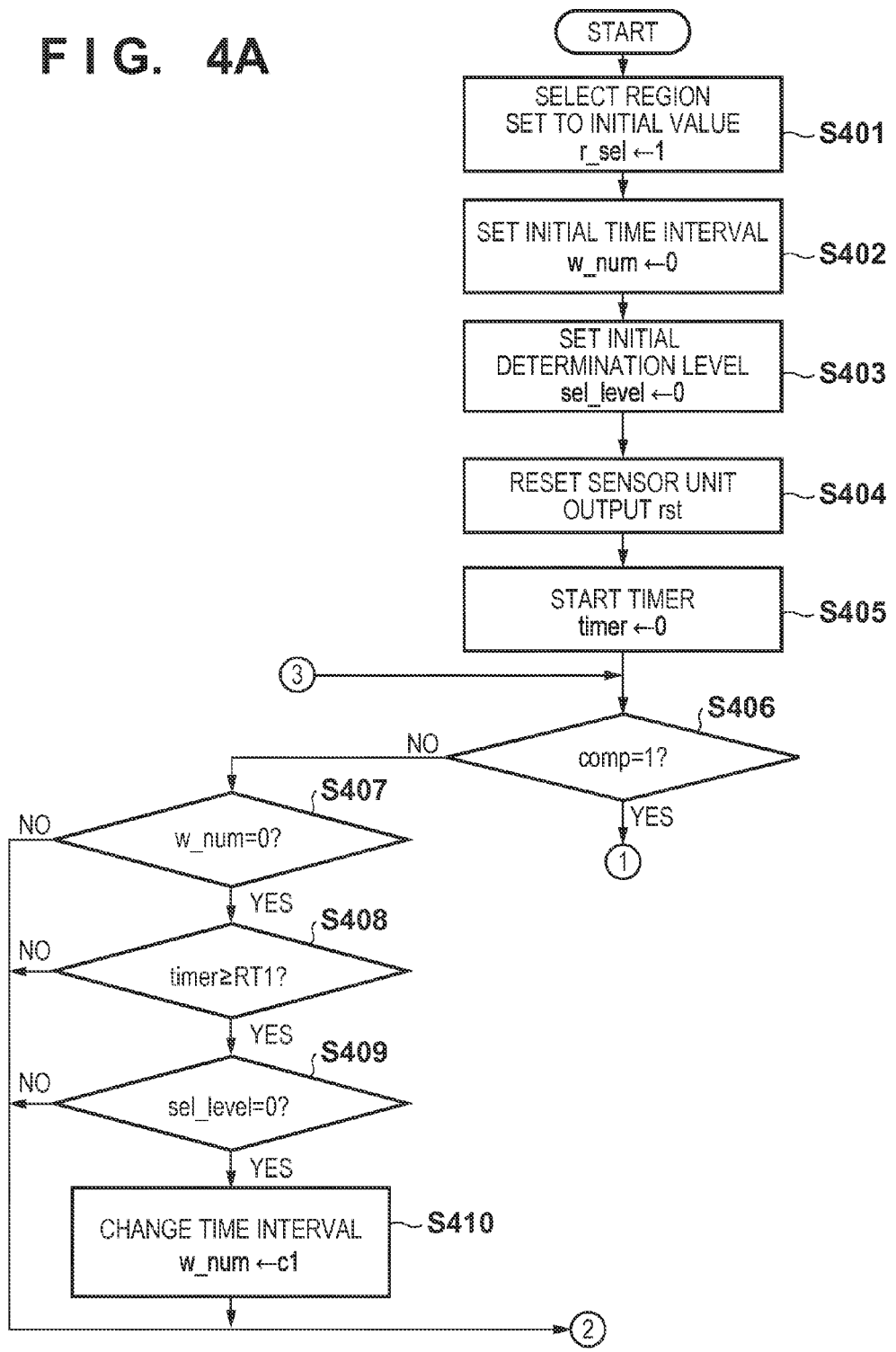
FIGS. 4A and 4B show a flowchart for illustrating an example of the operations of the focus detection apparatus of the first embodiment of the present invention.
Figure 4B:
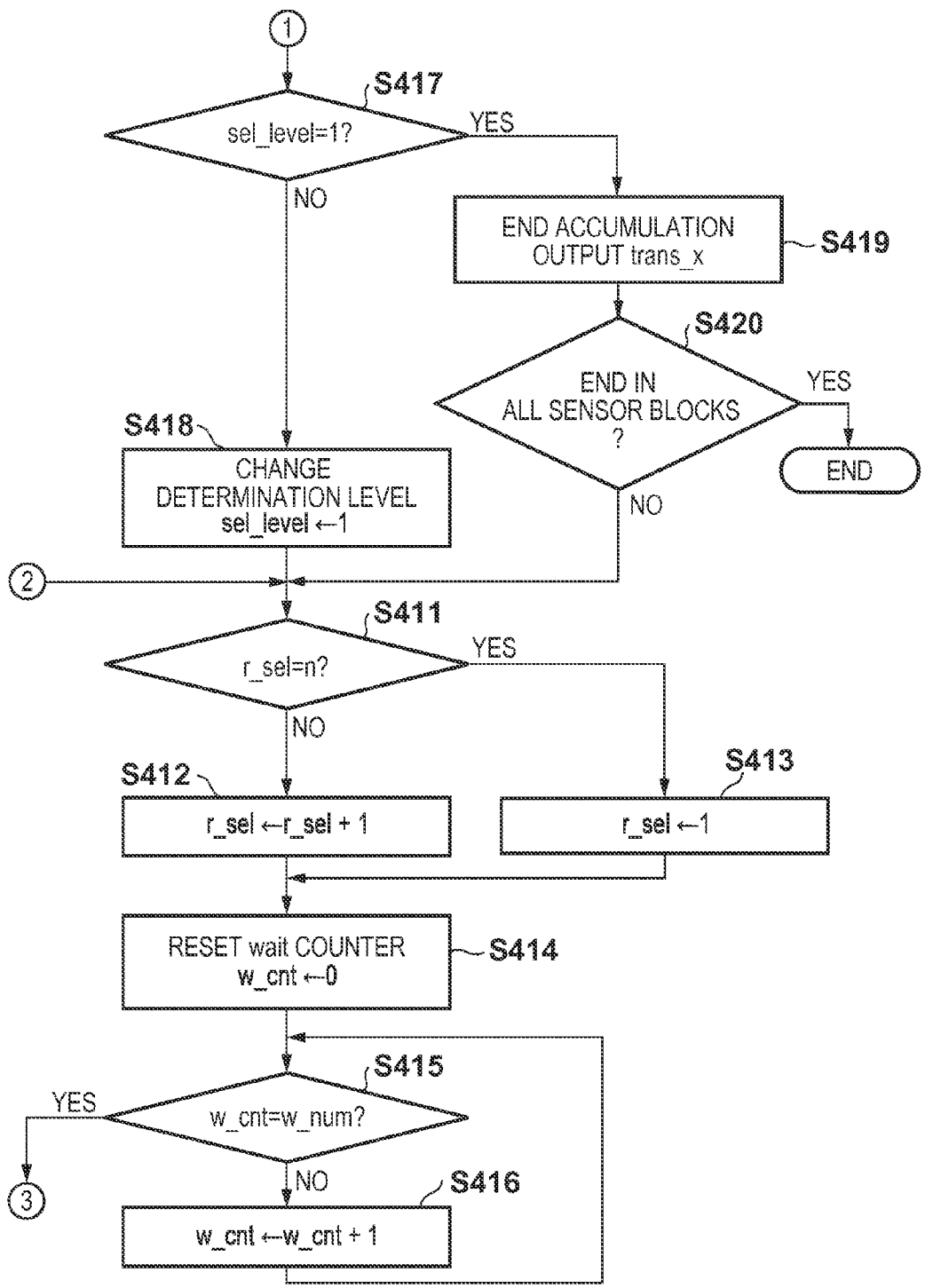

FIGS. 4A and 4B show a flowchart for illustrating an example of the operations of the focus detection apparatus 100 according to the first embodiment. In step S401, the controller 101 sets a register "r_sel" to an initial value "1". The register "r_sel" indicates a region to be processed (first region to n-th region in FIG. 1). The initial value "1" means that processing is started from the sensor block 102-1 located in the first region. The controller 101 selects and outputs one of signals sel_1 to sel_n and one of signals "psel_1" to psel_n in accordance with a value of the register "r_sel". For example, in the case where the register "r_sel" is "1", the controller 101 selects and outputs the signal "sel_1" and the signal "psel_1". Accordingly, the analog switches 111-1 and 112-1 are switched on.

In step S402, the controller 101 sets a register "w_num" to an initial value "0". The register "w_num" indicates a time interval for the determination by the comparator 104. If the value of the register "w_num" is "0", it means that the determination is performed at the shortest time interval "dt1". In step S403, the controller 101 sets a selection signal "sel_l-evel" supplied to the level output circuit 103 to "0". Accordingly, the value of the level signal "c_level" output from the level output circuit 103 to the comparator 104 will serve as the threshold "SH2". In step S404, the controller 101 outputs a reset signal "rst", and clears electric charges in the photoelectric conversion elements in the sensor units 115-1 to 115-n. Accordingly, the accumulation of electric charges is newly started. In step S405, the controller 101 sets the value of the timer 107 to an initial value "0". Accordingly, the time elapsed from when the accumulation of electric charges is started is measured.

In step S406, the controller 101 determines whether a signal "comp" from the comparator 104 is "1". If this determination is true, the processing proceeds to step S417. In this case, it means that the signal level "p_out" has reached the threshold. If this determination is false, the processing proceeds to step S407. In this case, it means that the signal level "p_out" has not reached the threshold.

In step S407, the controller 101 determines whether a value of the register "w_num" is "0". If this determination is true, the processing proceeds to step S408. In this case, it means that the comparator 104 performs the determination at the shorter time interval "dt1". If this determination is false, the processing proceeds to step S411. In this case, it means that the comparator 104 performs the determination at the longer time interval "dt2".

In step S408, the controller 101 determines whether a value of the timer 107 is greater than or equal to the reference time "RT1". If this determination is true, the processing proceeds to step S409. In this case, it means that the reference time "RT1" has elapsed from when the accumulation of electric charges is started. If this determination is false, the processing proceeds to step S411. In this case, it means that the reference time "RT1" has not elapsed from when the accumulation of electric charges is started.

In step S409, the controller 101 determines whether a selection signal "sel_level" is "0". If this determination is true, the processing proceeds to step S410. In this case, it means that the comparator 104 compares the signal level "p_out" with the threshold "SH2". If this determination is false, the processing proceeds to step S411. In this case, it means that the comparator 104 compares the signal level "p_out" with the threshold "SH1".

In step S410, the controller 101 changes a value of the register "w_num" to "c1". "c1" is a predetermined value greater than 0. Accordingly, subsequent determination in the comparator 104 will be performed at the longer time interval "dt2". In steps S411 to S413, the controller 101 increases a value of the register "r_sel" by 1. If this value is n, the controller 101 returns the value of the register "r_sel" to "1". Accordingly, the region to be processed shifts. In steps S414 to S416, the controller 101 waits for a time corresponding to the value of the register "w_num".

In the case where the result of the determination in step S406 is true, that is, in the case where the signal level "p_out" has reached a threshold, the controller 101 determines whether the selection signal "sel_level" is "1" in step S417. If this determination is true, the processing proceeds to step S419. In this case, it means that the signal level "p_out" has reached the threshold "SH1". If this determination is false, the processing proceeds to step S418. In this case, it means that the signal level "p_out" has reached the threshold "SH2". In view of this, the controller 101 sets the selection signal "sel_level" to "1" in step S418, and changes the comparison target in the comparator 104 to the threshold "SH1", and the processing proceeds to step S411.

In the case where the result of the determination in step S417 is true, that is, in the case where the signal level "p_out" has reached the threshold "SH1", the controller 101 outputs a signal "trans_x" ("x" is a value of the present register "r_sel") in step S419. Accordingly, the accumulation of electric charges in the photoelectric conversion elements in the sensor block within the target region ends. In step S420, the controller 101 determines whether the accumulation of electric charges has ended in all of the sensor blocks 102-1 to 102-n. If this determination is true, the processing ends. If this determination is false, the processing proceeds to step S411, and the controller 101 determines whether to end the accumulation with respect to remaining regions. After the accumulation of electric charges has ended in all of the sensor blocks 102-1 to 102-n, the detection unit 106 performs focus detection using image signals from the sensor blocks 102-1 to 102-n.

As schematically illustrated using FIGS. 3A and 3B, with the focus detection apparatus 100 of the present embodiment, in the case where it is determined that the reference time "RT1" has elapsed in step S408 and that the comparison target threshold is "SH2" in step S409, the controller 101 determines that the object has low luminance. In this case, the controller 101 lengthens a time interval for performing comparison after the reference time "RT1" in step S410. Then, when the level signal "p_out" in any region from the first region to the n-th region reaches the threshold "SH2", the controller 101 changes the comparison targets in all of the regions to the threshold "SH1".

On the other hand, in the case where the level signal "p_out" in any region from the first region to the n-th region has reached the threshold "SH2" before the reference time "RT1" has elapsed, the controller 101 determines that the object has high luminance and that the increase in the signal level "p_out" is steep. In this case, the controller 101 continues the comparison at the shorter time interval "dt1" in all of the regions. Accordingly, the controller 101 is able to improve the accuracy with which it is determined to end the accumulation.

Next, a focus detection apparatus according to a second embodiment of the present invention is described using FIGS. 5A and 5B, and FIGS. 6A and 6B. Because the operations of the controller 101 in the focus detection apparatus of the second embodiment are different from those of the first embodiment, and the other components may be the same, the following description focuses on the differences from the first embodiment.

Figure 5A:
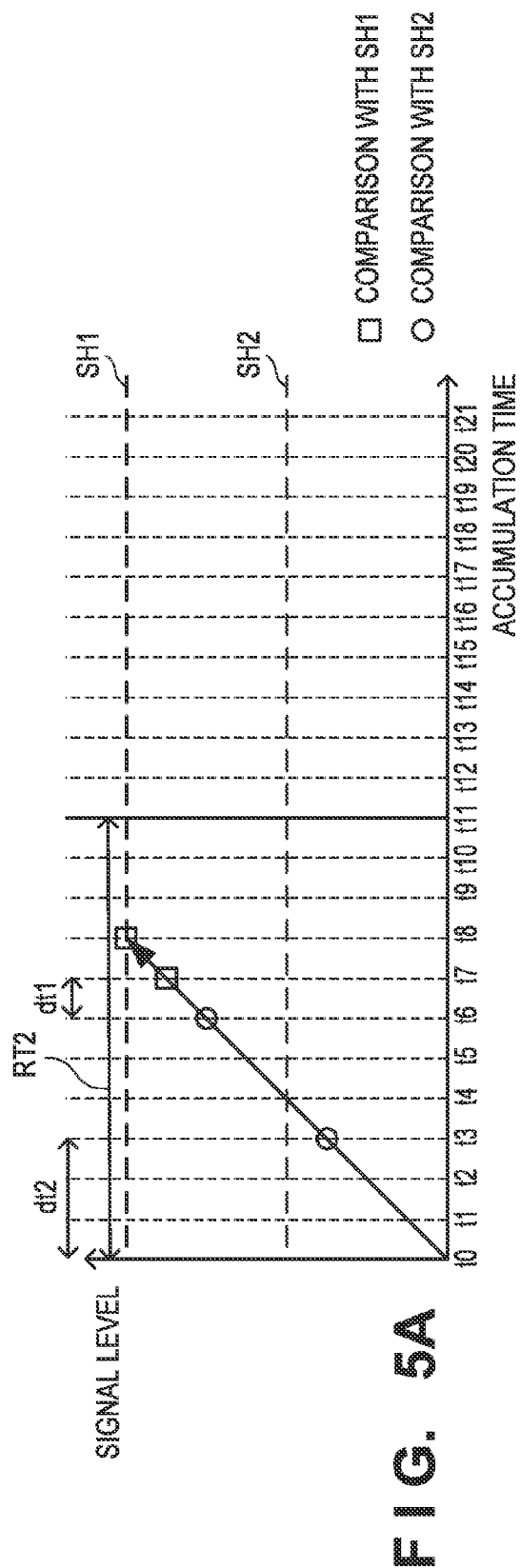
FIGS. 5A and 5B are diagrams for illustrating an overview of operations of the focus detection apparatus of a second embodiment of the present invention.
Figure 5B:
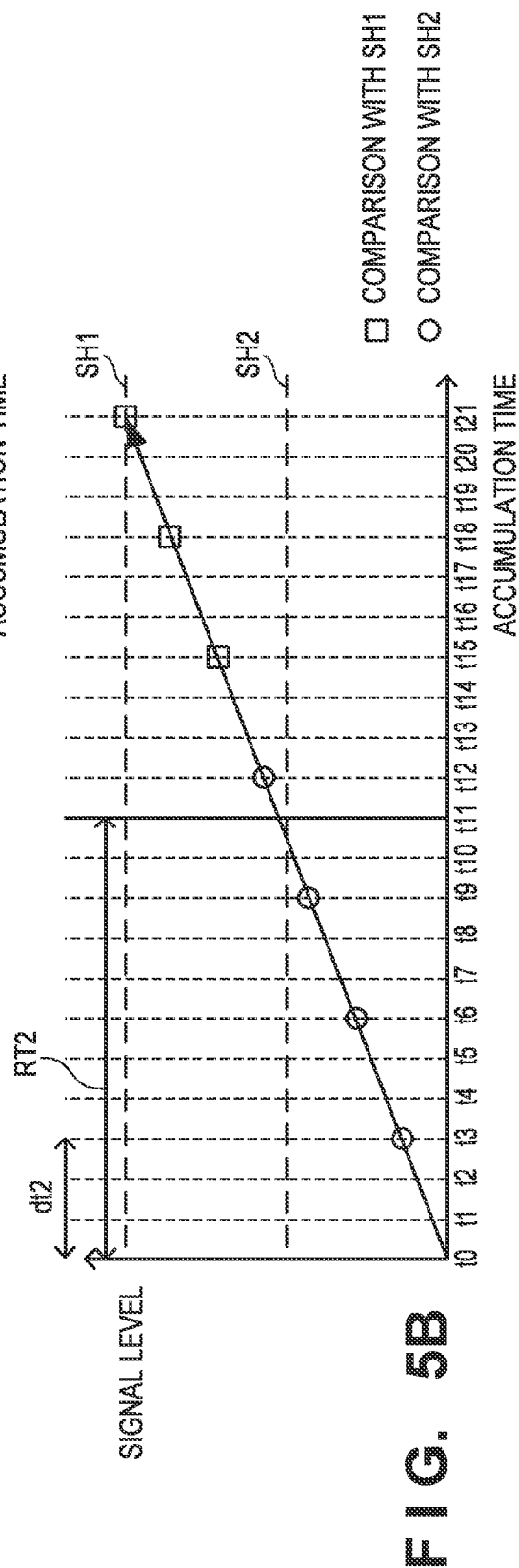

FIGS. 5A and 5B are diagrams for illustrating an overview of the operations of the focus detection apparatus 100 according to a variation. General descriptions of FIGS. 5A and 5B are omitted since these diagrams are similar to those of FIGS. 3A and 3B.

First, the operations of the focus detection apparatus 100 in the case of FIG. 5A are described. The controller 101 outputs a reset signal "rst" at time "t0", and causes the photoelectric conversion elements in the sensor unit 115-1 to start accumulation of electric charges. After the accumulation of electric charges is started, the controller 101 outputs a signal "psel_1" at the time interval "dt2", causes the comparator 104 to output a signal level "p_out" from the peak detection circuit 114-1, and causes the comparator 104 to determine whether the signal level "p_out" has reached a threshold "SH2". In the example of FIG. 5A, it is determined that the signal level "p_out" has reached the threshold "SH2" at time "t6". In this case, the controller 101 switches a target to be compared with the signal level "p_out" in the comparator 104 to a threshold "SH1". Additionally, since the time elapsed from when the accumulation of electric charges is started has not exceeded a reference time "RT2" at this point, the controller 101 causes the comparator 104 to determine whether the signal level "p_out" has reached the threshold "SH1" at the time interval "dt1" that is shorter than the time interval "dt2". The reference time "RT2" may be set in a register (not shown) in the controller 101 in advance (prior to starting accumulation, for example). In the example of FIG. 5A, it is determined that the signal level "p_out" has reached the threshold "SH1" at time "t8". Thereafter, the controller 101 ends the accumulation of electric charges, and stores the electric charges in the sensor unit 115-1 in the memory unit 113-1 as pixel signals. Then the detection unit 106 performs focus detection based on these pixel signals.

Next, the operations of the focus detection apparatus 100 in the case of FIG. 5B are described. The controller 101 outputs a reset signal "rst" at time "t0", and causes the photoelectric conversion elements in the sensor unit 115-1 to start accumulation of electric charges. After the accumulation of electric charges is started, the controller 101 outputs a signal "psel_1" at the time interval "dt2", causes the comparator 104 to output the signal level "p_out" from the peak detection circuit 114-1, and causes the comparator 104 to determine whether the signal level "p_out" has reached the threshold "SH2". In the example of FIG. 5B, it is determined that the signal level "p_out" has reached the threshold "SH2" at time "t12". In this case, the controller 101 switches a target to be compared with the signal level "p_out" in the comparator 104 to the threshold "SH1". Since the time elapsed from when the accumulation of electric charges is started has exceeded the reference time "RT2" at this point, the controller 101 continues to cause the comparator 104 to determine whether the signal level "p_out" has reached the threshold "SH1" at the time interval "dt2". In the example of FIG. 5B, it is determined that the signal level "p_out" has reached the threshold "SH1" at time "t21". Thereafter, the controller 101 ends the accumulation of electric charges, and stores the electric charges in the sensor unit 115-1 in the memory unit 113-1 as pixel signals. Then, the detection unit 106 performs focus detection based on these pixel signals.

In the present embodiment, as shown in FIG. 5A, since the signal level "p_out" is compared with the threshold "SH1" at the shorter time interval "dt1" only after it is determined that the signal level "p_out" has elapsed the threshold "SH2" in the case where the object has high luminance, it is possible to reduce power consumption while preventing the signal level "p_out" from becoming saturated. Also, as shown in FIG. 5B, since the signal level "p_out" is always compared with the thresholds "SH1" and "SH2" at the longer time interval "dt2" in the case where the object has low luminance, it is possible to reduce the number of comparisons by the comparator 104 and the power consumption of the focus detection apparatus 100. Additionally, it is possible to further reduce the power consumption by turning off the power source of the peak detection circuit 114-1 in the case where the comparison is not performed.

Figure 6A:
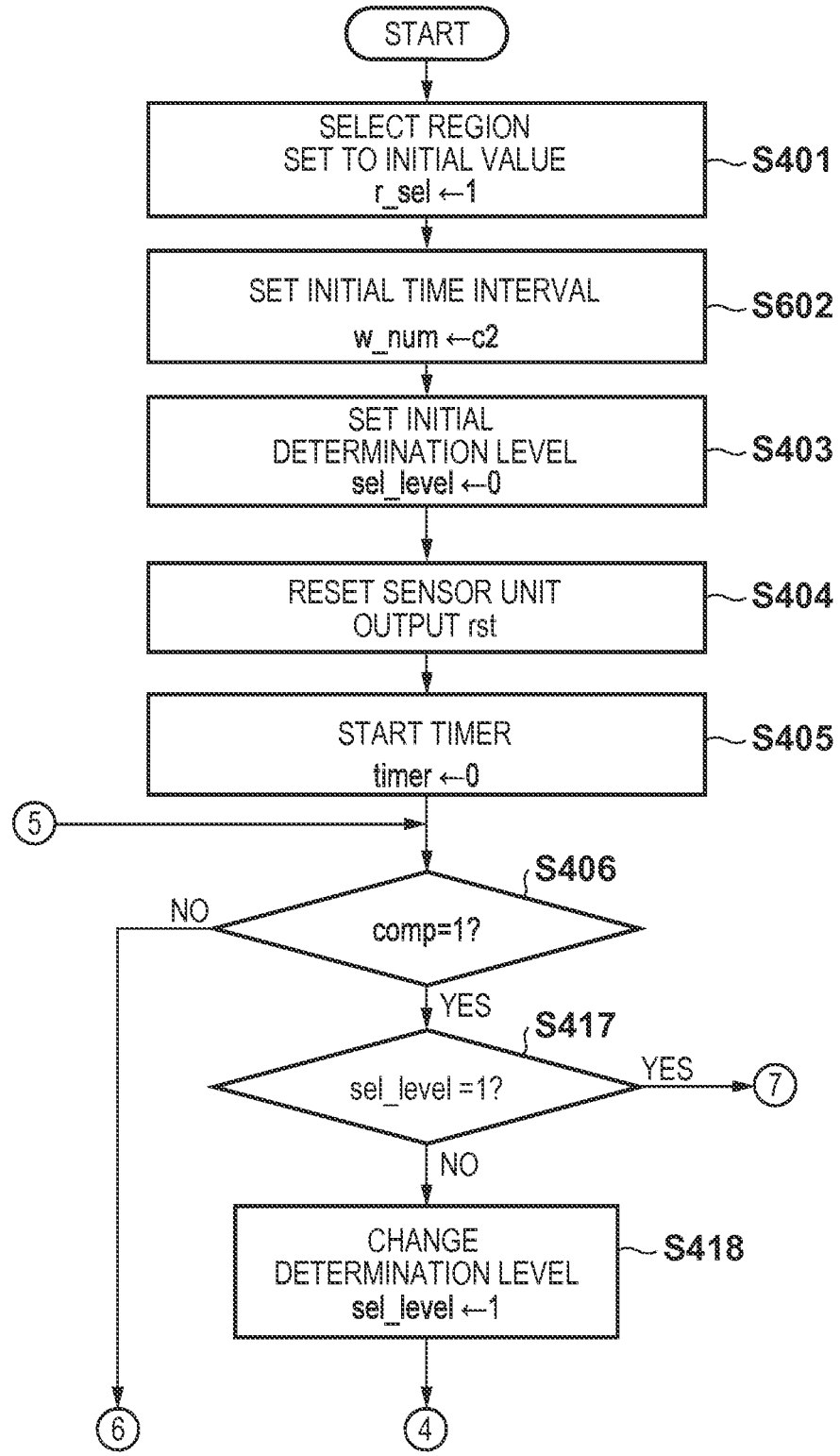
FIGS. 6A and 6B show a flowchart for illustrating an example of the operations of the focus detection apparatus of the second embodiment of the present invention.
Figure 6B:
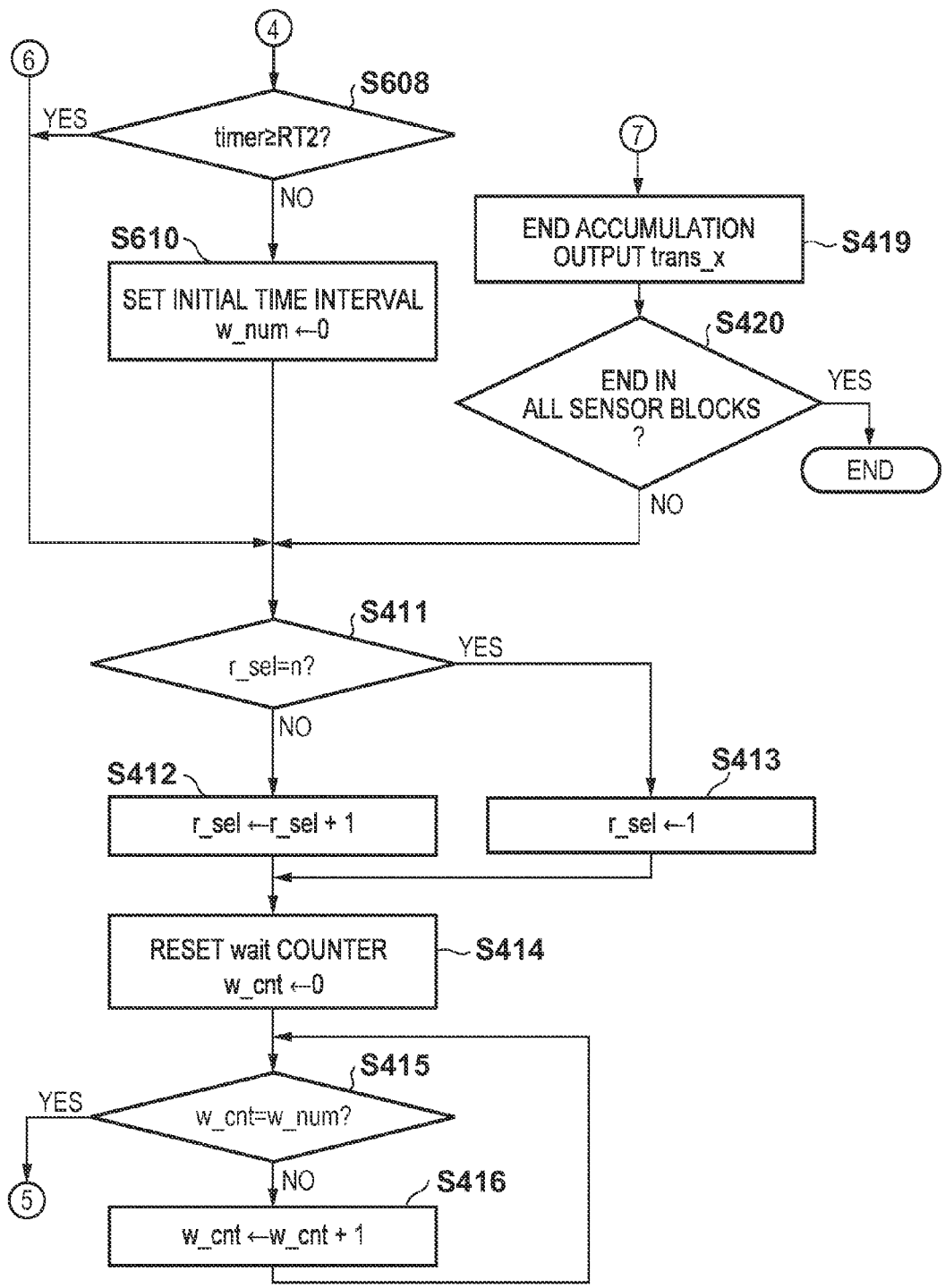

FIGS. 6A and 6B show a flowchart for illustrating an example of the operations of the focus detection apparatus 100 according to the variation. The same reference numerals are given to the same operations as in the flowchart of FIGS. 4A and 4B and the descriptions thereof are omitted. In step S602, the controller 101 sets a register "w_num" to an initial value "c2". "c2" is a predetermined value greater than 0. The register "w_num" indicates a time interval used in the determination by the comparator 104. If the value of the register "w_num" is "c2", it means that the determination is performed at the longer time interval "dt2". In step S608, the controller 101 determines whether the value of the timer 107 is greater than or equal to the reference time "RT2". If this determination is true, the processing proceeds to step S411. In this case, it means that the reference time "RT2" has elapsed from when the accumulation of electric charges is started. If this determination is false, the processing proceeds to step S610. In this case, it means that the reference time "RT2" has not elapsed from when the accumulation of electric charges is started. In step S610, the controller 101 changes the value of the register "w_num" to "0". Accordingly, subsequent determination in the comparator 104 will be performed at the shorter time interval "dt1".

As schematically illustrated using FIGS. 5A and 5B, with the focus detection apparatus 100 of the present embodiment, in the case where it is determined that the signal level "p_out" has reached the threshold "SH2" in steps S406 and S417 and that the reference time "RT2" has not elapsed in step S608, the controller 101 determines that the object has high luminance. In this case, the time interval is switched to the short time interval "dt1" and the comparison with the threshold "SH1" is performed in all of the regions. Accordingly, the controller 101 is able to improve the accuracy with which it is determined to end the accumulation.

On the other hand, in the case where it is determined that the signal level "p_out" has reached the threshold "SH2" in steps S406 and S417 and that the reference time "RT2" has elapsed in step S608, the controller 101 determines that the object has low luminance and that the increase in signal level "p_out" is gentle. In this case, the controller 101 performs the comparison with the threshold "SH1" at the longer time interval "dt2" as it is in all of the regions.

Figure 7:
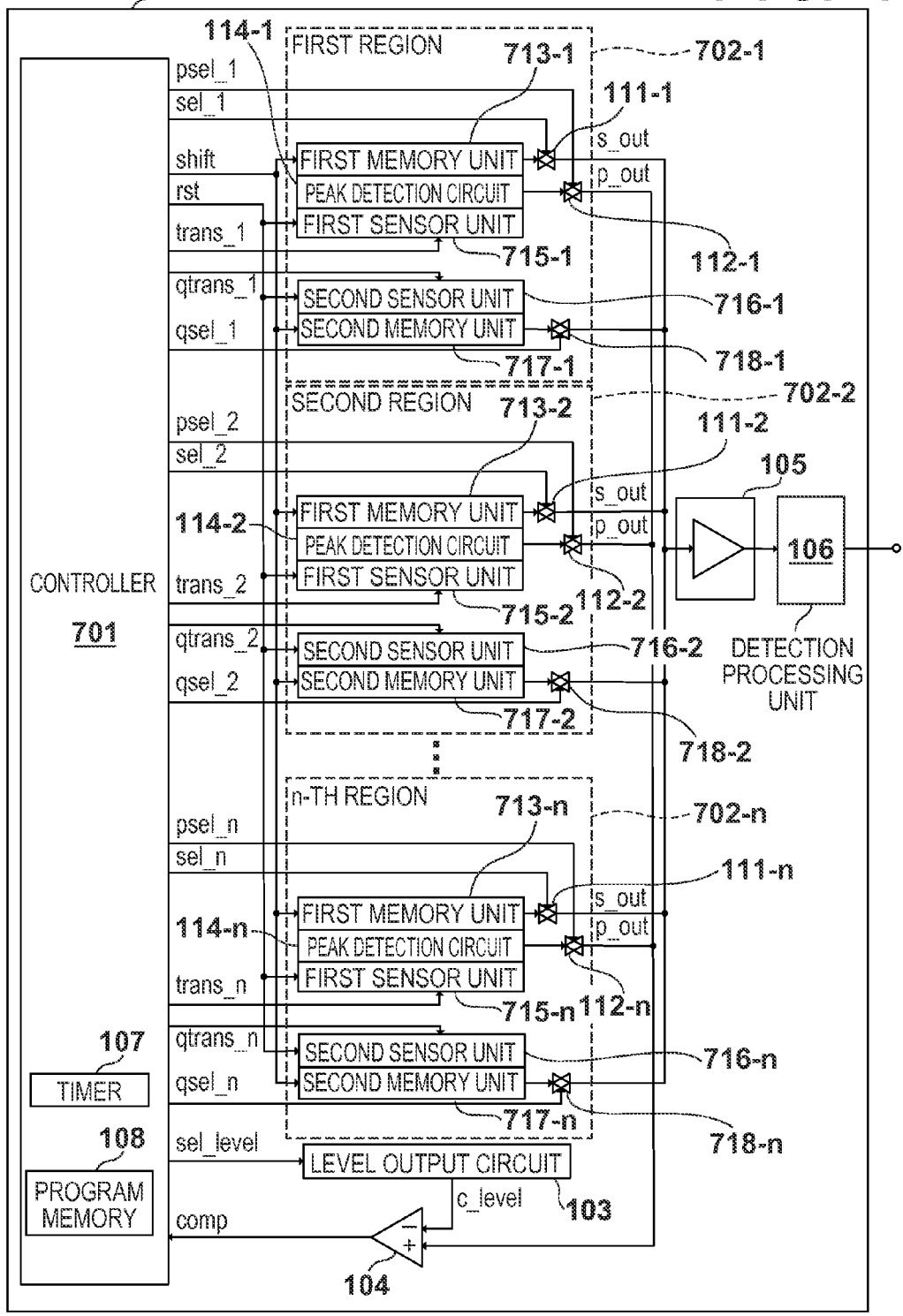
FIG. 7 is a block diagram showing an example of a focus detection apparatus of a variation of the first embodiment of the present invention.

Next, a variation of the focus detection apparatus 100 according to the first embodiment of the present invention is described using FIG. 7. A similar variation is applicable to the second embodiment of the present invention. Hereinafter, differences from the first embodiment are mainly described, and matters that are not particularly mentioned are similar to the first embodiment. This variation may have the same effects as the first embodiment.

FIG. 7 is a block diagram showing an example of a focus detection apparatus 700 according to a variation of the first embodiment. The focus detection apparatus 700 may include a controller 701 and sensor blocks 702-1 to 702-n instead of the controller 101 and the sensor blocks 102-1 to 102-n of the focus detection apparatus 100. Since each of the sensor blocks has a similar configuration, the configuration and the operation of the sensor block 702-1 are described hereinafter as a representative example. The sensor block 702-1 may include a first memory unit 713-1, a second memory unit 717-1, a peak detection circuit 114-1, a first sensor unit 715-1, a second sensor unit 716-1, and a plurality of analog switches 111-1, 112-1 and 718-1. The first memory unit 713-1 and the second memory unit 717-1 respectively have the same configuration as that of the memory unit 113-1 in FIG. 1, and are arranged physically adjacent to each other so as to have the same focus detection point. The first sensor unit 715-1 and the second sensor unit 716-1 respectively have the same configuration as that of the sensor unit 115-1 in FIG. 1.

The peak detection circuit 114-1 measures electric charges accumulated in each of photoelectric conversion elements in the first sensor unit 715-1, and outputs to the analog switch 112-1 a signal level "p_out" indicating the maximum value of the electric charges in the plurality of photoelectric conversion elements in the first sensor unit 715-1. The first sensor unit 715-1 clears the electric charges accumulated in its own photoelectric conversion elements in the case of receiving a reset signal "rst" from the controller 701, and newly starts accumulation of electric charges immediately thereafter. Also, the first sensor unit 715-1 ends the accumulation of electric charges in its own photoelectric conversion elements in the case of receiving a signal "trans_1" from the controller 701, and stores the accumulated electric charges in the first memory unit 713-1 as pixel signals. The second sensor unit 716-1 clears the electric charges accumulated in its own photoelectric conversion elements in the case of receiving a reset signal "rst" from the controller 701, and newly starts accumulation of electric charges immediately thereafter. Also, the second sensor unit 716-1 ends the accumulation of electric charges in its own photoelectric conversion elements in the case of receiving a signal "qtrans_1" from the controller 701, and stores the accumulated electric charges in the second memory unit 717-1 as pixel signals. When the controller 701 outputs a signal "qsel_1", the analog switch 718-1 is switched on. In this state, when the controller 701 outputs a signal "shift", pixel signals stored in the second memory unit 717-1 are sequentially output to the readout amplifier 105.

Next, the operations of the controller 701 are described, focusing on differences from the operations of the controller 101. In step S404 of FIG. 4A, the controller 701 outputs a reset signal "rst", and clears electric charges in the photoelectric conversion elements in both the first sensor units 715-1 to 715-n and the second sensor units 716-1 to 716-n at the same time. In step S419, the controller 701 outputs signals "trans_x" and "qtrans_x" ("x" is a value of the present register "r_sel"), and ends accumulation of electric charges in photoelectric conversion elements of the sensor block within the target region. In the present variation, the signal level is measured using the electric charges accumulated in the photoelectric conversion elements in the first sensor unit 715-1, and focus detection is performed using the electric charges accumulated in the photoelectric conversion elements in the second sensor unit 716-1. Accordingly, generation of noise during electric charge accumulation is prevented and the accuracy of focus detection with respect to an object having low luminance is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-021339 filed Feb. 2, 2012, which is hereby incorporated by reference herein in its entirety.

What is claimed is:

1. A focus detection apparatus comprising:
a control unit configured to cause a photoelectric conversion element in a sensor to accumulate an electric charge;
a timer unit configured to measure a time elapsed from when accumulation of the electric charges is started;
a measurement unit configured to measure a signal level indicating an amount of the electric charges accumulated in the photoelectric conversion element;
a determination unit configured to perform a first determination for determining whether the signal level has reached a first threshold, and to perform a second determination for determining whether the signal level has reached a second threshold that is greater than the first threshold; and
a detection unit configured to perform focus detection using a signal obtained from the photoelectric conversion element in the sensor,
wherein during a time period from when it is determined that the signal level has reached the first threshold to when it is determined that the signal level has reached the second threshold, the determination unit performs the second determination at a first time interval if an elapsed time from when the accumulation of the electric charges is started to when it is determined that the signal level has reached the first threshold is shorter than a reference time, and performs the second determination at a second time interval that is longer than the first time interval if the elapsed time is longer than the reference time,
in a case where it is determined that the signal level has reached the second threshold, the control unit ends the accumulation of the electric charges, and
the detection unit performs focus detection using a signal obtained from the sensor after the accumulation of the electric charges has ended.

2. The apparatus according to claim 1, wherein in a case where it is determined that the signal level has not reached the first threshold in the first determination performed after the reference time has elapsed from when the accumulation of the electric charges is started, the determination unit performs the first determination at the second time interval.

3. The apparatus according to claim 1, wherein during a time period from when the accumulation of the electric charges is started to when the reference time elapses, the determination unit performs the first determination and the second determination at the first time interval.

4. The apparatus according to claim 1, wherein during a time period from when the accumulation of the electric charges is started to when it is determined that the signal level has reached the first threshold, the determination unit performs the first determination at the second time interval.

5. The apparatus according to claim 1,
wherein the sensor has a first sensor and a second sensor,
the control unit synchronizes and controls accumulation of an electric charge by a photoelectric conversion element in the first sensor and accumulation of an electric charge by a photoelectric conversion element in the second sensor,
the measurement unit measures a signal level indicating an amount of the electric charges accumulated in the photoelectric conversion element in the first sensor, and
the detection unit performs focus detection using a signal obtained from the second sensor after the accumulation of the electric charges has ended.

6. A method for controlling a focus detection apparatus that includes a sensor having a photoelectric conversion element that accumulates an electric charge, the method comprising:
measuring a signal level indicating an amount of the electric charges accumulated in the photoelectric conversion element;
determining whether the signal level has reached a first threshold;
determining whether the signal level has reached a second threshold that is greater than the first threshold;
ending the accumulation of the electric charges in a case where it is determined that the signal level has reached the second threshold; and
performing focus detection using a signal obtained from the sensor after the accumulation of the electric charges has ended,
wherein during a time period from when it is determined that the signal level has reached the first threshold to when it is determined that the signal level has reached the second threshold, whether the signal level has reached the first threshold is determined at a first time interval if an elapsed time from when the accumulation of the electric charges is started to when it is determined that the signal level has reached the first threshold is shorter than a reference time, and whether the signal level has reached the second threshold is determined at a second time interval that is longer than the first time interval if the elapsed time is longer than the reference time.

* * * * *